US010908419B2

(12) United States Patent
Gross et al.

(10) Patent No.: US 10,908,419 B2
(45) Date of Patent: Feb. 2, 2021

(54) SMARTGLASSES AND METHODS AND SYSTEMS FOR USING ARTIFICIAL INTELLIGENCE TO CONTROL MOBILE DEVICES USED FOR DISPLAYING AND PRESENTING TASKS AND APPLICATIONS AND ENHANCING PRESENTATION AND DISPLAY OF AUGMENTED REALITY INFORMATION

(71) Applicant: Lucyd Ltd., Singapore (SG)

(72) Inventors: Clifford M Gross, Miami, FL (US); Harrison Gross, North Miami, FL (US)

(73) Assignee: Lucyd Ltd., London (GB)

( * ) Notice: Subject to any disclaimer, the term of this patent is extended or adjusted under 35 U.S.C. 154(b) by 99 days.

(21) Appl. No.: 16/022,097

(22) Filed: Jun. 28, 2018

(65) Prior Publication Data

US 2020/0004016 A1    Jan. 2, 2020

(51) Int. Cl.
    *G02B 27/01*     (2006.01)
    *G06F 3/01*     (2006.01)
    (Continued)

(52) U.S. Cl.
    CPC .......... *G02B 27/017* (2013.01); *G06F 1/163* (2013.01); *G06F 3/011* (2013.01); *G06F 3/1423* (2013.01);
    (Continued)

(58) Field of Classification Search
CPC ........ G06F 1/163; G06F 3/011; G06F 3/1423; G02B 27/017; G02B 2027/0178; H04L 12/282; H04M 1/7253
See application file for complete search history.

(56) References Cited

U.S. PATENT DOCUMENTS

| 4,904,078 | A | 2/1990 | Gorike |
| 9,201,578 | B2 | 12/2015 | Scott et al. |

(Continued)

FOREIGN PATENT DOCUMENTS

| CN | 103309226 A | 9/2013 |
| CN | 203313378 U | 11/2013 |

(Continued)

OTHER PUBLICATIONS

"Landscape of AR companies with product announcements or product availability".

(Continued)

*Primary Examiner* — Amare Mengistu
*Assistant Examiner* — Jennifer L Zubajlo
(74) *Attorney, Agent, or Firm* — Ellenoff Grossman & Schole LLP; John C. Stellabotte

(57) ABSTRACT

Smartglasses, methods, and systems to control presentation and display of information related to mobile device tasks and applications to the smartglasses or a paired or connected smartwatch or smartphone, based on oral commands or requests, and enhance presentation and display augmented reality information, based on default settings of a device mobile application controlling display of information related to tasks and applications and oral override or switch commands. The smartglasses comprise corrective lenses, printed circuit board, battery, camera, microphone bone conducting speakers, connectivity module, artificial intelligence interface and run a smartglasses mobile application, the mobile application and artificial intelligence interface and are configured and programmed to communicate the requested tasks and applications to a mobile device application controlling display and presentation of information related to the requested tasks or applications, which can reside in the smartglasses, smartwatch, or smartphone.

26 Claims, 9 Drawing Sheets

(51) Int. Cl.
    *G06T 19/00*     (2011.01)
    *H04M 1/725*     (2006.01)
    *H04L 12/28*     (2006.01)
    *G06F 1/16*     (2006.01)
    *G06F 3/14*     (2006.01)

(52) U.S. Cl.
    CPC .......... *G06T 19/006* (2013.01); *H04L 12/282* (2013.01); *H04M 1/7253* (2013.01); *G02B 2027/0178* (2013.01)

(56) References Cited

U.S. PATENT DOCUMENTS

| | | | |
|---|---|---|---|
| 9,253,806 | B2 | 2/2016 | Choi et al. |
| 9,277,159 | B2 | 3/2016 | Shin et al. |
| 9,535,497 | B2 | 1/2017 | Rose et al. |
| 9,589,390 | B2 | 3/2017 | DeStories et al. |
| 10,037,084 | B2 | 7/2018 | Joo |
| 10,412,633 | B1* | 9/2019 | Kotecha ............... H04L 47/29 |
| 2007/0220108 | A1 | 9/2007 | Whitaker |
| 2009/0097688 | A1 | 4/2009 | Lewis |
| 2012/0004919 | A1 | 1/2012 | Muth |
| 2012/0200499 | A1* | 8/2012 | Osterhout ............... G06F 1/163 345/158 |
| 2013/0177194 | A1 | 7/2013 | Han et al. |
| 2014/0140531 | A1 | 5/2014 | Lee et al. |
| 2014/0336781 | A1 | 11/2014 | Katyal et al. |
| 2015/0100621 | A1 | 4/2015 | Pan |
| 2015/0289217 | A1* | 10/2015 | Ban ............... H04W 56/001 455/41.2 |
| 2015/0358614 | A1 | 12/2015 | Jin |
| 2015/0379896 | A1 | 12/2015 | Yang et al. |
| 2016/0026253 | A1 | 1/2016 | Bradski et al. |
| 2016/0070439 | A1 | 3/2016 | Bostick et al. |
| 2016/0078512 | A1 | 3/2016 | Yopp et al. |
| 2016/0236614 | A1* | 8/2016 | Heo ............... B60Q 9/00 |
| 2017/0103440 | A1* | 4/2017 | Xing ............... G06F 3/017 |
| 2018/0144554 | A1 | 5/2018 | Watola et al. |
| 2018/0277123 | A1* | 9/2018 | Boesen ............... G06F 3/04883 |
| 2019/0089456 | A1* | 3/2019 | Kasilya Sudarsan ... H04W 4/38 |
| 2019/0378515 | A1* | 12/2019 | Kim ............... G06F 40/35 |

FOREIGN PATENT DOCUMENTS

| | | |
|---|---|---|
| CN | 105354161 A | 2/2016 |
| CN | 103713737 | 1/2017 |
| EP | 2739055 A1 | 6/2014 |
| WO | 2013171731 A1 | 11/2013 |
| WO | 2017031033 A1 | 2/2017 |
| WO | 2017096099 A1 | 6/2017 |
| WO | 2018059934 A1 | 4/2018 |

OTHER PUBLICATIONS

"Waveguide comparison spreadsheet."
Proof of Concept Optical Engineering, LLC. "Review of Smartglasses Demonstrated at CES 2018." Jan. 17, 2018.
WaveOptics Ltd. "Unlocking Augmented Reality with World Class Optical Technology," 2018.
Hadar, et al. "Working Memory Load Affects Processing Time in Spoken Word Recognition: Evidence from Eye-Movements." Frontiers in Neuroscience, May 19, 2016.
Jones, Skott E. "Adult Word Learning as a Function of Neighborhood Density." Languages, Mar. 6, 2018.
Karthika, et al. "Hololens." International Journal of Computer Science and Mobile Computing, vol. 6, Issue 2, Feb. 2017, pp. 41-50.
Lenovo Group Limited. "Lenovo™ New Glass C200 Adds Smart Glasses to Portfolio." Online. Internet. Published Jan. 3, 2017. Accessed Jul. 12, 2018. http://blog.lenovo.com/en/blog/lenovo-new-glass-c200-adds-smart-glasses-to-portfolio/.
Shen, et al. "Semantic information mediates visual attention during spoken word recognition in Chinese: Evidence from the printed-word version of the visual-world paradigm." Attention, Perception, & Psychophysics, Jul. 2016. vol. 78, Issue 5, pp. 1267-1284.
Vuzix Corporation. "M100 Smart Glasses Product Guide, Enterprise Edition." Product Manual, 2015.
Bose Frames Audio Sunglasses, Black. Online. Internet. Accessed Sep. 27, 2019. https://www.amazon.com/Bose-Frames-Audio-Sunglasses-Black/dp/B07P7VVCDD/ref=asc_df BO7P7VVCDD/?tag=hyprod-20&linkCode=df0&hvadid . . . .
Amazon Smart Bluetooth Headset Glasses, Detachable Outdoor Car Universal HD Polarized Sunglasses for Driving, Outdoor Fish . . . Online. Internet. Accessed Oct. 1, 2019. https://www.amazon.com/Smart-Bluetooth-Detachable-Universal-Sunglasses/dp/B07QHS5G9M.
Amazon Kodak Prescription Eyeglasses Alien 5 Bone Conduction Glasses Blue Ray Filtering Wireless Bluetooth 4.1 Headphones Myopia Hyperopia Astigmatism Waterproof for IOS Android (Bright Black Frame). Online. Internet. Accessed Oct. 1, 2019. https://www.amazon.com/Prescription-Eyeglasses-Conduction-Headphones-Astigmatism/dp/B07NTDJ9N7/ref=sr_1_3?keywords=smart+glasses+pre . . . .
Amazon Duco Sunglasses for Men Over Glasses Sunglasses for Women Polarized Sunglasses 8953. Online. Internet. Accessed Sep. 27, 2019. https://www.amazon.com/dp/B07MZ2CT99?ref_=ams_ad_dp_ovrl.
Amazon Vocal Skull Alien 5 Bone Conduction Glasses Polarized Sunglasses Headphones Headset Music Stereo Hearing Aid for Sports Running Cycling Hiking iOS Android Matted Black Frame (Frame+Mold Lens) . Online. Internet. Accessed Apr. 24, 2019. https://www.amazon.com/Vocal-Skull-Conduction-Sunglasses-Headphones/dp/B07KLSSQST.
Bose Frames Alto. Online. Internet. Accessed Apr. 24, 2019. https://www.bose.com/en_us/products/wearables/frames/bose-frames-alto.html.
Bose Frames Rondo. Online. Internet. Accessed Apr. 24, 2019. https://www.bose.com/en_us/products/wearables/frames/bose-frames-rondo.html.
Bose Frames. Online. Internet. Accessed Apr. 24, 2019. https://www.bose.con/en_us/products/wearables/frames.html.
Lucyd Upgrade Your Eyewear. Online. Internet. Accessed Apr. 24, 2019. https://www.lucyd.co/.
Zungle. Online. Internet. Accessed Apr. 24, 2019. https://www.zungleinc.com/.

* cited by examiner

SMARTGLASSES AND METHODS AND SYSTEMS FOR USING ARTIFICIAL INTELLIGENCE TO CONTROL MOBILE DEVICES USED FOR DISPLAYING AND PRESENTING TASKS AND APPLICATIONS AND ENHANCING PRESENTATION AND DISPLAY OF AUGMENTED REALITY INFORMATION

FIELD OF THE INVENTION

The present invention relates to smartglasses, and methods and systems to control mobile devices used for presentation and display of common mobile device tasks and applications and enhancing presentation and display of augmented reality information with smartglasses or other mobile devices paired or connected to smartglasses while not reducing visual acuity.

BACKGROUND

Augmented reality (AR) is an interactive experience of a real-world environment whose elements are "augmented" by computer-generated perceptual information, including visual and auditory information. The augmented information can be constructive (i.e., additive to the natural environment) or destructive (i.e., masking of the natural environment) and is seamlessly interwoven with the physical world such that it is perceived as an immersive aspect of the real environment.

By contrast, virtual reality completely replaces the user's real-world environment with a simulated one. More specifically, the present invention relates to methods and systems for using artificial intelligence (AI) to enhance experiencing augmented reality information and the performance of mobile computing tasks typically performed on a smartphone. Augmented reality information can be and has been included on devices resembling eyeglasses. Such smartglasses can include eyewear that employ cameras to intercept the real-world view and augment it with a virtual graphical or aural interface projected from their eyepieces directly onto the user's eye or onto a layer of a transparent lens (or to the user's ear in the case of audio-only smartglasses).

Examples of augmented reality smartglasses include Google Glass, Vuzix Blade AR, Vuzix M-100, Vuzix Wrap 310 L, Sony SmartEye Glass, Lockdown Focus, Everysight Raptor, Epson, Occulus, Lumis, Letin AR, Cast AR, Moverio BT-200, Meta, Laster See Thru, Icis, ORA-S, Glass UP, K-Glass, Solos, ODG AR/R8 and R9, Microsoft HoloLens, Optinvent Ora-2MG 5 Smart Glass AR, and GarminVaria Vision.

AR smartglasses have limitations. Presenting AR imagery in the glasses can occlude or obscure the ability of the user to use the glasses to improve their natural vision. This is a significant problem for persons who need the lenses of the AR smartglasses to be corrective lenses.

On the other hand, there are also limitations on AR smartglasses to present the AR imagery or auditory information in a manner that allows it to be viewed or heard effectively due to limitations in displaying AR imagery and presenting AR auditory information with smartglasses.

There are two categories of optical hardware solutions that seek to address this problem: conventional optical combiners and emerging waveguide combiners. But to date, optical hardware solutions have not proven to solve the problems of tradeoffs between visual quality, AR image quality and power consumption for portability and day long use.

Certain AR imagery or auditory information are more effectively viewed or heard using smartglasses, while other AR imagery or auditory information can be better and more easily viewed, heard or interacted with on other devices that can be paired or connected with the smartglasses, such as a smartwatch or smartphone. Using a smartwatch to view certain AR or standard mobile computing interface imagery can have advantages over a smartphone in that a user must continually hold a smartphone, whereas using a smartwatch affixed to the user's wrist to view interfaces would simply require moving the wrist or head to view the face of the watch i.e., handsfree operation.

Chinese Patent Application CN103309226A describes associating smartglasses with a smartwatch so that AR imagery can be viewed using the smartglasses or smartwatch. But the approach described in CN103309226A requires using a manual touch control unit on the smartglasses to control display to the smartwatch.

Chinese Patent Application CN105354161A describes a system for viewing and listening to information on different mobile devices that does not require manual operation. It automatically displays information on the device with the higher priority based on information stored in a priority judgment module. Although this approach improves on approaches requiring manual operation, it has its limitations and does not provide the user with the flexibility to have real-time control over the specific device for displaying specific information when the device does not have higher priority.

What is needed are improved methods and systems to enhance experiencing of augmented reality imagery and information, and common mobile computing tasks, among smartglasses having prescription lenses and other devices paired with or in communication with the smartglasses. For example, phones and smartwatches using voice controls that leverage the capabilities of artificial intelligence (AI) interfaces, such as Siri, Bixby or Alexa to control where AR information is viewed or heard while simultaneously mitigating the current AR visual limitations in regard to field of view, transparency, eye relief and eye box size.

As described below, wearable devices, such as bone conduction audio smartglasses and cellular-enabled smartwatches can interact with a user to supply them with useful information, often in a handsfree context. When these two types of wearables are working together, they can mitigate their individual weaknesses and create a near-complete mobile computing experience that can free the user from the need to carry a smartphone to perform common tasks.

By having smartglasses and a smartwatch working in tandem via a smartwatch mobile application, the shortcomings of each of these wearables can be covered by the other. As explained below, alternatively, the smartglasses and smartwatch could work in tandem via a smartglasses, smartwatch, or smartphone mobile application.

For example, the smartglasses are better at receiving audio input than the smartwatch, and the smartwatch is better at displaying visual content than the glass, so via the connective smartwatch mobile application, one could ideally see a video on the smartwatch while listening to it on the smartglasses. This particular "splitting" of an audiovisual data signal onto two devices would happen automatically, via the setting of user preferences in the smartwatch mobile application, the "Link" app described below. The smartwatch mobile application while running in the background performs the task of managing the output data of a particular application or task to best fit the user.

SUMMARY OF THE INVENTION

As described in further detail herein below, the methods and systems, and devices described herein employ a novel design to control mobile devices used for presentation and display of mobile device tasks and applications, enhance presentation, control and display of AR information with smartglasses or other mobile devices paired or connected to smartglasses, while not reducing visual acuity, and improve the synergistic functionality of wearable devices.

In one aspect, smartglasses are provided comprising a bridge, rims, the rims comprising corrective lenses, temples connected to end pieces, a printed circuit board, memory, battery, camera, microphone, bone conduction speakers, connectivity module, cellular communications unit and hardware, and artificial intelligence interface in electronic communication, the connectivity module and the cellular communications unit and hardware configured and programmed to pair or connect the smartglasses to a smartphone or smartwatch, the smartglasses configured and programmed to receive oral requests or commands at the microphone and artificial intelligence interface to perform mobile device tasks or applications and process and communicate the oral requests or commands to a mobile device application controlling paired or connected devices used for display or presentation of information related to the requested or commanded tasks or applications, the mobile device application controlling paired or connected devices used for display or presentation of information related to requested or commanded tasks or applications, configured and programmed to display or present information related to the requested or commanded tasks or applications on the smartglasses, a paired or connected smartwatch or paired or connected smartphone based on default settings.

In one embodiment, the default settings are stored in memory in lookup tables of the mobile device application controlling paired or connected devices used for display or presentation of information related to the requested or commanded tasks or applications and are set in a settings screen.

In another embodiment, the smartglasses further comprise a smartglasses mobile application, wherein the mobile device application controlling paired or connected devices used for display or presentation of information related to requested or commanded tasks or applications is the smartglasses mobile application.

In another embodiment, the mobile device application controlling paired or connected devices used for display or presentation of information related to requested or commanded tasks or applications is a smartwatch mobile application.

In another embodiment, the mobile device application controlling paired or connected devices used for display or presentation of information related to requested or commanded tasks or applications is a smartphone mobile application.

In another embodiment, the default settings for presenting augmented reality information related to SMS text messages are a paired or connected smartwatch.

In another embodiment, the artificial intelligence interface is configured and programmed to vocalize SMS text messages in the smartglasses and to receive and send orally dictated responses via SMS text messages.

In another embodiment, wherein the default settings for phone calls are the smartglasses.

In another embodiment, the default settings for phone calls further comprise presenting visual information on one or more of call duration, phone number, or and signal strength on a paired or connected smartwatch.

In another embodiment, the default settings for receiving push notifications is the paired or connected smartwatch.

In another embodiment, the default settings for receiving push notifications further comprise receiving audible information of push notifications at the smartglasses.

In another embodiment, the default settings for receiving visual information from navigation applications is the paired or connected smartwatch.

In another embodiment, the default settings for receiving audio information from navigation applications is the smartglasses.

In another embodiment, the default settings for a weather application, music application, or app store application is one or both of the smartglasses and the paired or connected smartwatch.

In another embodiment, the default settings for visual data from stock application is the paired or connected smartwatch and the smartglasses for pricing alerts.

In another embodiment, the default settings for video and video sound can be controlled from and displayed on one or both of the smartglasses and the paired or connected smartwatch or a paired or connected smartphone.

In another embodiment, the mobile device application controlling paired or connected devices used for display or presentation of information related to requested or commanded tasks or applications and the artificial intelligence interface are programmed to receive at the microphone oral commands to override or switch the default settings and display or present information as specified in the override or switch command and the smartglasses are configured and programmed to receive oral requests or commands at the microphone and artificial intelligence interface and process and communicate the oral requests or commands to the mobile device application controlling paired or connected devices used for display or presentation of information related to requested or commanded tasks or applications.

In another embodiment, the smartglasses mobile application and the artificial intelligence interface are programmed to receive at the microphone an oral switch or override command to switch display from a mobile device in the default settings to another paired or connected device or devices as specified in the switch or override command.

In another embodiment, the connectivity module is configured and programmed to pair or connect the smartglasses to smart home systems, including heating, cooling, or lighting systems.

In another aspect, a method for controlling display and presentation of information related to mobile device tasks or applications with smartglasses is provided comprising setting a device mobile application for controlling connected or paired mobile devices used for presentation and display of mobile device tasks or applications; pairing or connecting the smartglasses with one or more paired or connected mobile devices using a smartglasses connectivity module or a cellular communications unit and hardware, wherein the paired or connected devices include a smartwatch and a smartphone; making an audible command or request at a microphone of the smartglasses to display or present information related to the commanded or requested mobile device task or application; the smartglasses processing the command at an artificial intelligence interface of the smartglasses, the smartglasses comprising prescription lenses; communicating the command or request to the device mobile application controlling connected or paired mobile devices used for presentation and display of mobile device tasks; and receiving the information related to the commanded or requested mobile device task or application on the smartglasses or a paired or connected smartwatch or smartphone based on preset default settings.

In another embodiment, the preset default settings are stored in lookup tables on the device mobile application controlling connected or paired mobile devices used for presentation and display of mobile device tasks or applications.

In another embodiment, the device mobile application controlling the connected or paired mobile devices used for presentation and display of mobile device tasks or applications is a smartglasses mobile application.

In another embodiment, wherein the device mobile application controlling the connected or paired mobile devices used for presentation and display of mobile device tasks or applications is a smartwatch mobile application.

In another embodiment, the device mobile application controlling the connected or paired mobile devices used for presentation and display of mobile device tasks or applications is a smartphone mobile application.

In another embodiment, the method further comprises receiving an override or switch command at the smartglasses microphone to override or switch displaying the information related to the request or command to display or present information related to the commanded or requested mobile device task or application from a mobile device in the default settings to one or more other mobile devices paired or connected mobile devices, the smartglasses communicating the override or switch request to the device mobile application controlling the connected or paired mobile devices used for presentation and display of mobile device tasks or applications; and receiving the information related to the commanded or requested mobile device task or application at the one or more other mobile devices.

In another embodiment, the method further comprises pairing or connecting the smartglasses with smart home systems, including heating, cooling, or lighting systems; and controlling the smart home systems through voice commands spoken to the smartglasses.

In another embodiment, the method further comprises using the paired or connected mobile devices used for communicating with public blockchains, and perform blockchain transactions.

In another embodiment, the method further comprises using the paired or connected mobile devices mobile device tasks or applications reading and acting on QR codes or unique biometric identifier data.

In another embodiment, the method further comprises using the paired mobile devices for communicating biometric security information and using the biometric security information to perform cryptographic functions performed in a token wallet application.

DETAILED DESCRIPTION

Figure 1:
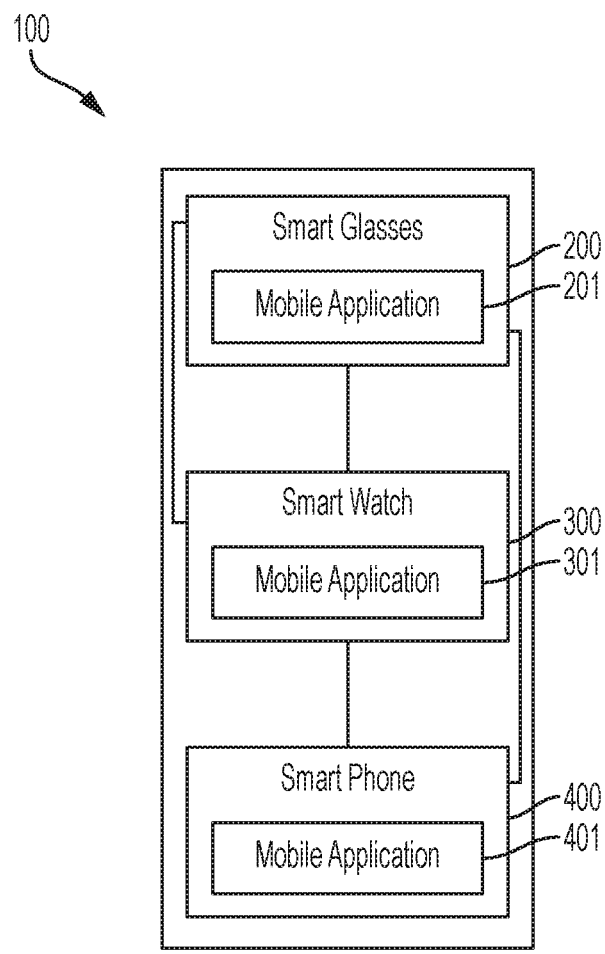
FIG. 1 depicts a schematic diagram of a system for using artificial intelligence to control mobile devices used for presentation and display of mobile device tasks and control mobile devices used for presentation and display of mobile device tasks and applications and enhance presentation and display of augmented reality information with smartglasses or other mobile devices paired or connected to smartglasses, while not reducing visual acuity.

System 100 of FIG. 1 can include smartglasses 200, an optional mobile application 201 resident on the smartglasses 200, smartwatch 300 with mobile application 301, and smartphone 400 with mobile application 401.

Figure 2:
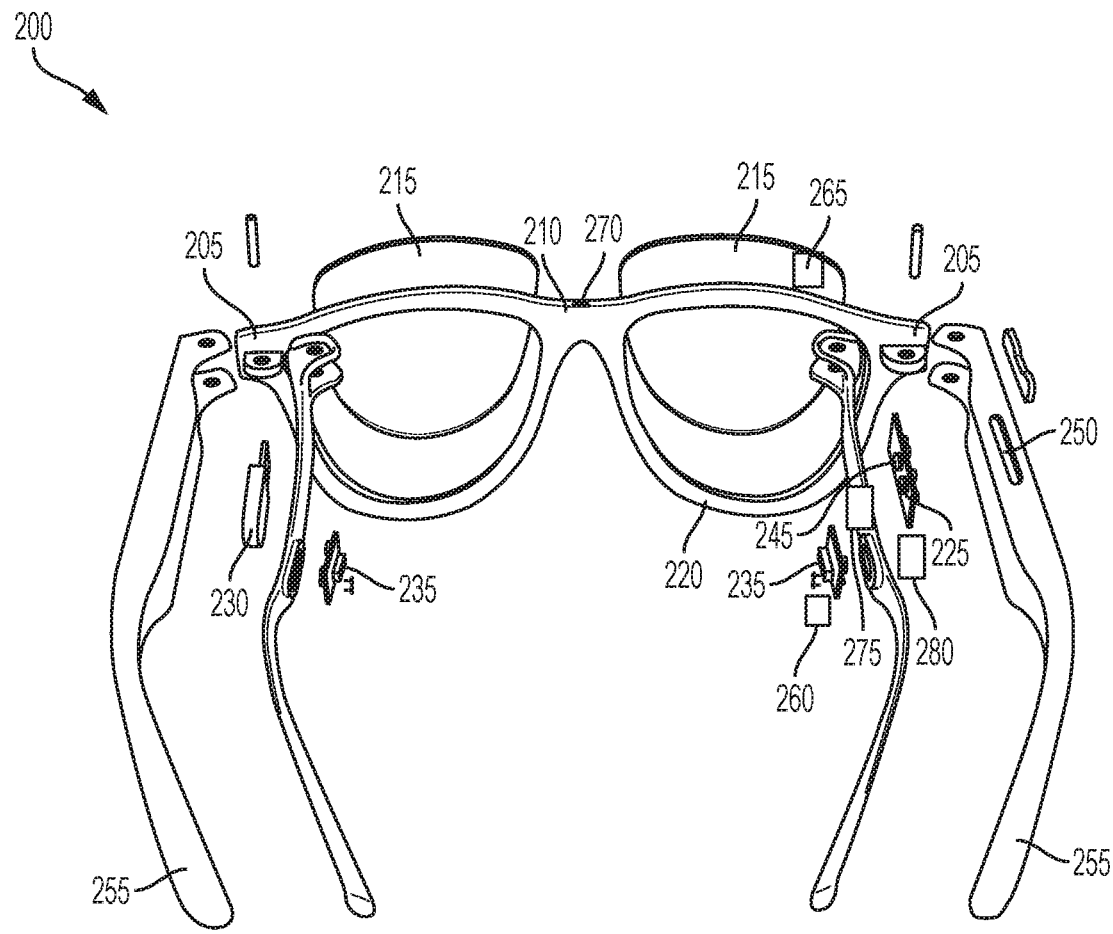
FIG. 2 illustrates smartglasses that can be used in accordance with the methods and systems for using artificial intelligence to control mobile devices used for presentation and display of mobile device tasks and control mobile devices used for presentation and display of mobile device tasks and applications and enhance presentation and display of augmented reality information with smartglasses or other mobile devices paired or connected to smartglasses, while not reducing visual acuity.

FIG. 2 depicts smartglasses 200 that can be used in accordance with the methods and systems for using artificial intelligence to enhance experiencing augmented reality information described herein. The smartglasses 200 can have a bridge 210 with end pieces 205 connected to temples 255 and corrective lenses 215 in rims 220. The temples 255 include a microphone 225, battery 230, bone conduction speakers 235, printed circuit board 245, control pad 250, connectivity module and hardware 260, camera 265, and USB connection 270, and cellular communications unit and hardware 275, which enables the smartglasses 200 to communicate over the cellular wireless network, and smartglasses AI interface 280, all of which are electronically connected.

The connectivity module and hardware 260 may use WiFi, Bluetooth, near field communication, and/or other types of wireless technology standards to pair and/or communicate with other mobile devices, including smartphones and smartwatches, such as smartwatch 300 and smartphone 400. Other components not depicted could also be included in the smartglasses 200.

Figure 3A:
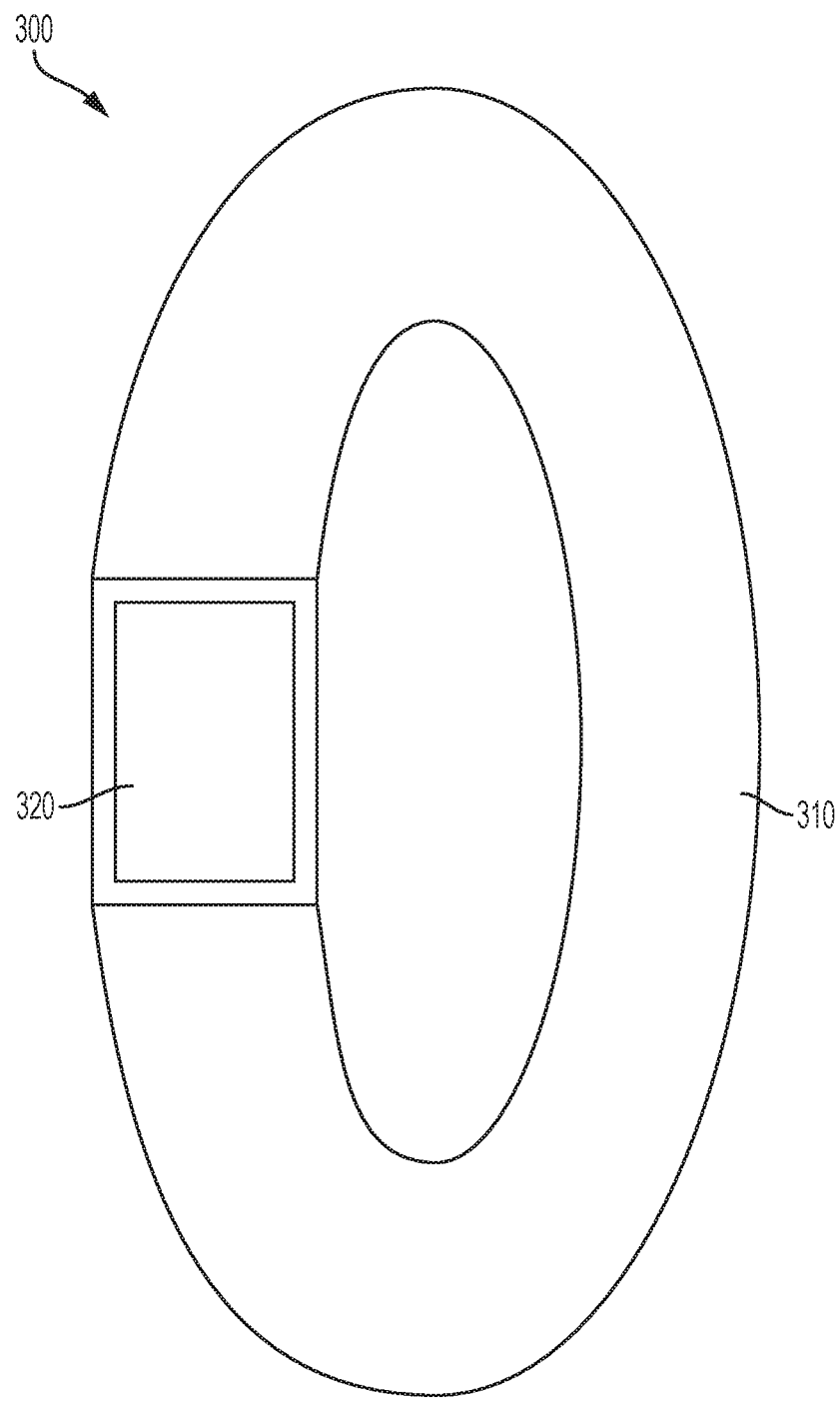
FIG. 3A illustrates a smartwatch that can be used in accordance with the methods and systems for using artificial intelligence to control mobile devices used for presentation and display of mobile device tasks and control mobile devices used for presentation and display of mobile device tasks and applications and enhance presentation and display of augmented reality information with smartglasses or other mobile devices paired or connected to smartglasses, while not reducing visual acuity as presented herein.

FIG. 3A depicts a smartwatch 300 that can be used in accordance with the methods and systems for using artificial intelligence to enhance experiencing augmented reality information described herein. The smartwatch 300 has a wrist band 310 and display 320. The display 320 can be a conventional LCD or LED display, and can include a touchpad or panel.

Figure 3B:
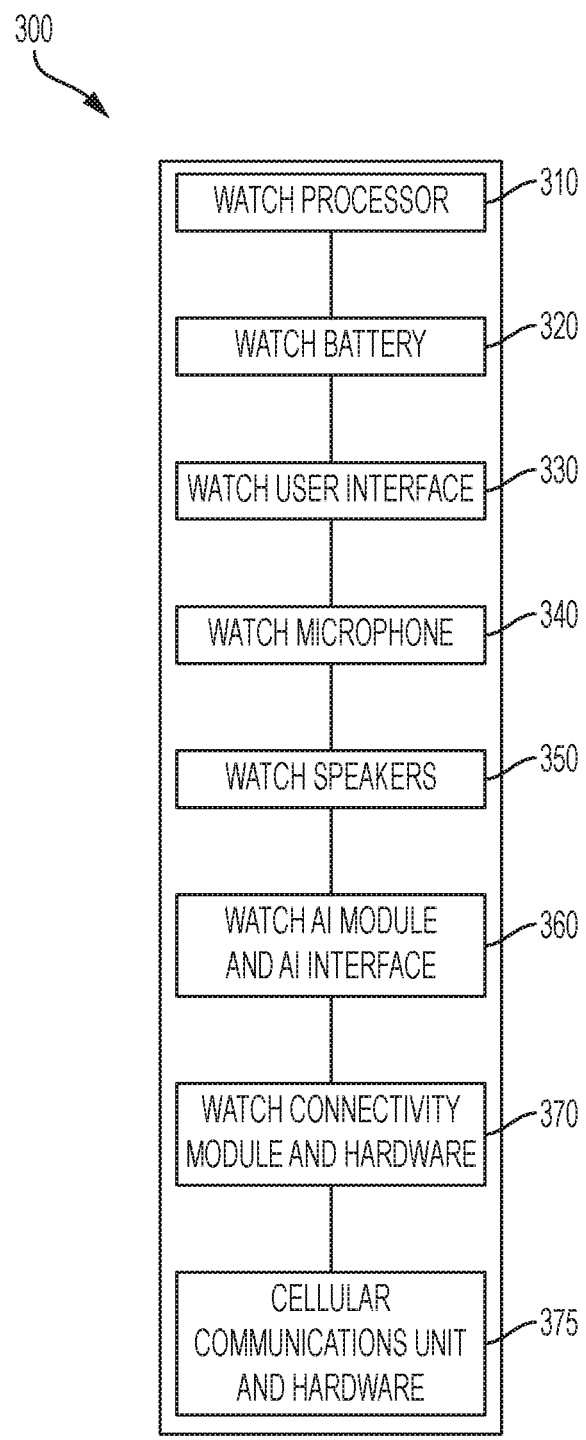
FIG. 3B is a schematic diagram of the smartwatch of FIG. 3A.

FIG. 3B is a schematic diagram of components and modules of smartwatch 300 that can include watch processor 310, battery 320, watch user interface 330, watch microphone 340, watch speakers 350, and watch artificial intelligence (AI) module and interface 360, and smartwatch connectivity module and hardware 370, which may use WiFi, Bluetooth, near field communication, and/or other types of wireless technology standards to pair and/or communicate with other mobile devices, and cellular communications unit and hardware 375, which enables the smartwatch 300 to communicate over the cellular network. Other components of smartwatch 300 not depicted could also be included in the smartwatch 300, such as an accelerometer a GPS chip and memory unit.

Smartglasses 200 can communicate with smartwatch 300 using connectivity module and hardware 260 or cellular communications unit and hardware 275 and either smartwatch mobile application 301 or the optional smartglasses mobile application 201.

Smartglasses 200 can also communicate with smartphone 400 using connectivity module and hardware 260 or cellular communications unit and hardware 275, smartphone connectivity module and hardware 490, cellular communications unit and hardware 495, smartphone mobile application 401 or the optional smartglasses mobile application 201.

Figure 4A:
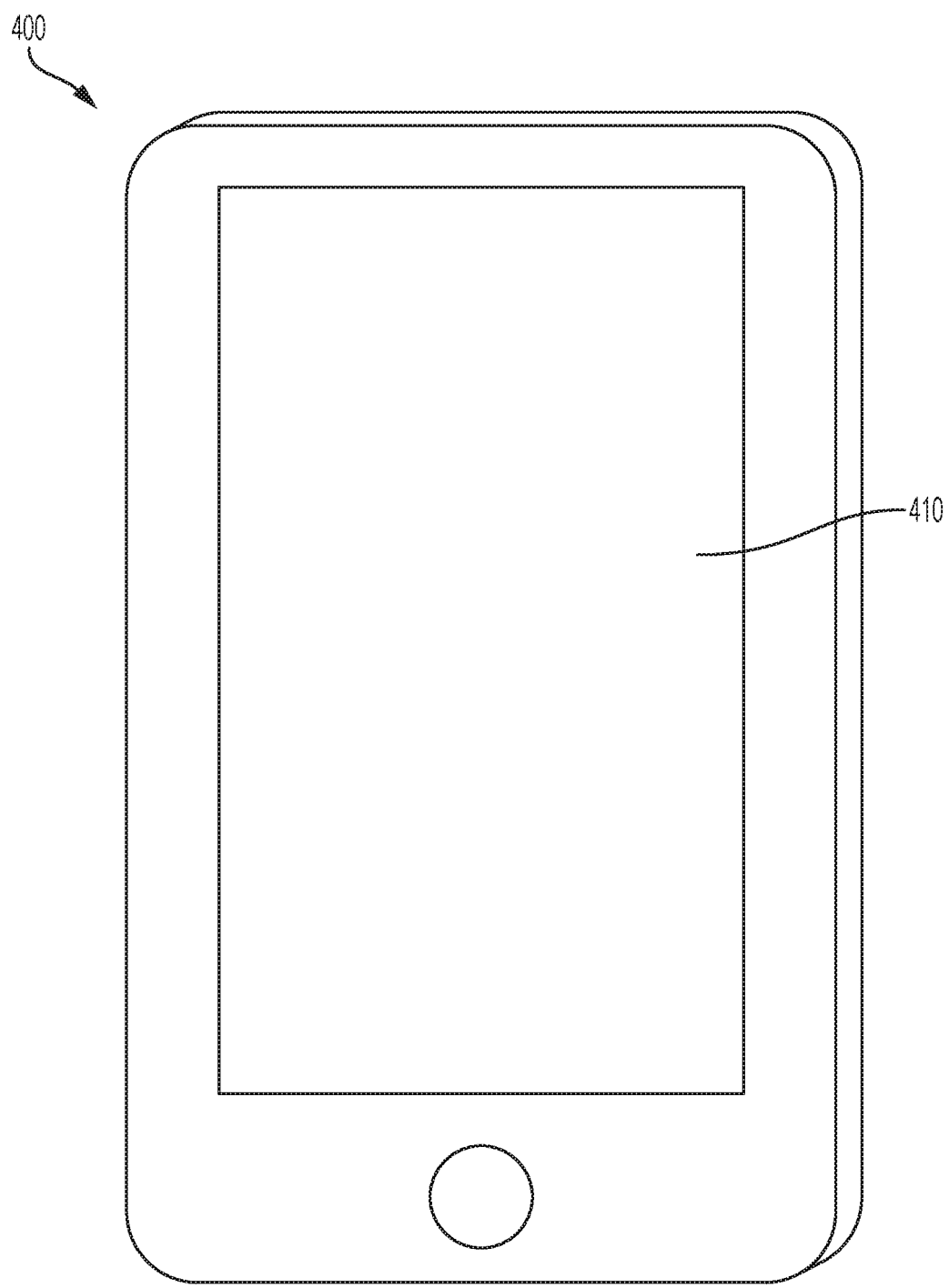
FIG. 4A illustrates a smartphone that can be used in accordance with the methods and systems for using artificial intelligence to control mobile devices used for presentation and display of mobile device tasks and control mobile devices used for presentation and display of mobile device tasks and applications and enhance presentation and display of augmented reality information with smartglasses or other mobile devices paired or connected to smartglasses, while not reducing visual acuity.

FIG. 4A depicts a smartphone 400 with smartphone display 410 that can optionally be used in accordance with the methods and systems for using artificial intelligence to enhance experiencing augmented reality information described herein. The display 410 can be a conventional LCD or LED display, and can include a touchpad or panel.

Figure 4B:
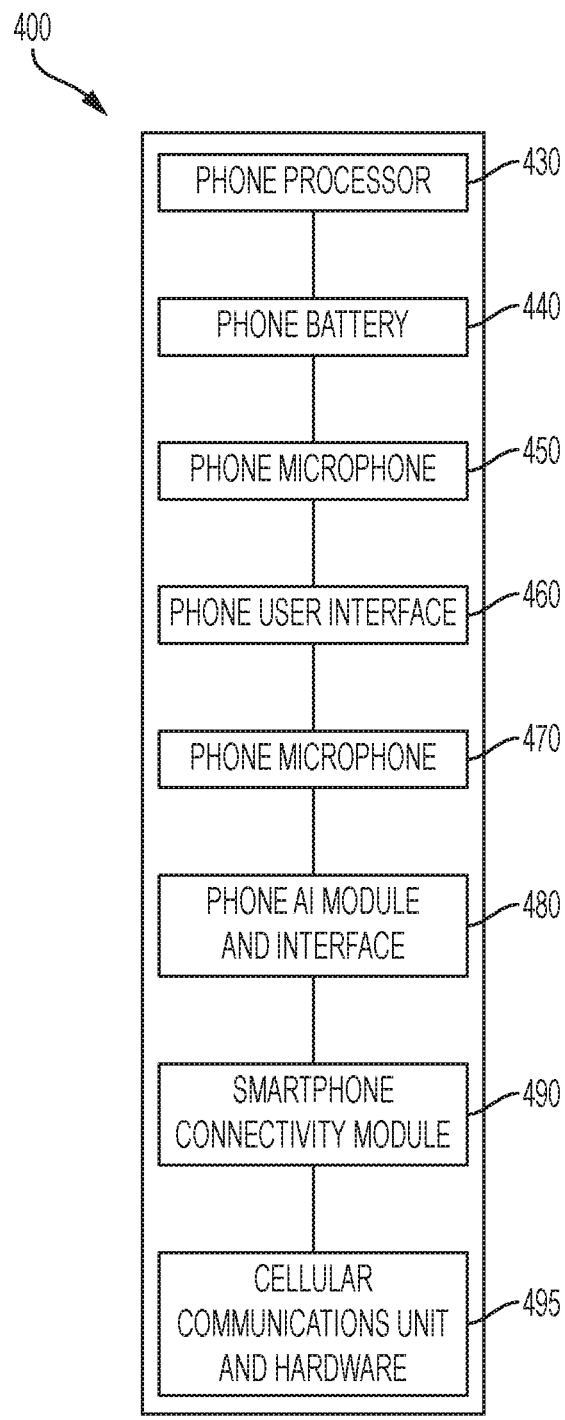
FIG. 4B is a schematic diagram the smartphone of FIG. 4A that can be used in accordance with the methods and systems for using artificial intelligence to control mobile devices used for presentation and display of mobile device tasks and control mobile devices used for presentation and display of mobile device tasks and applications and enhance presentation and display of augmented reality information with smartglasses or other mobile devices paired or connected to smartglasses, while not reducing visual acuity described herein in accordance with the inventions described herein.

FIG. 4B is a schematic diagram of components and modules of smartphone 400 that can include phone processor 430, phone battery 440, phone microphone 450, phone user interface 460, phone speakers 470, phone artificial intelligence (AI) module and interface 480, and smartphone connectivity module and hardware 490, which may use WiFi, Bluetooth, near field communication, and/or other types of wireless technology standards to pair and/or communicate with other mobile devices, and cellular communications unit and hardware 495, which enables the smartphone 400 to communicate over the cellular network. Other components and modules also can be included in smartphone 400, such as a GPS chip, memory, and an accelerometer.

Figure 5:
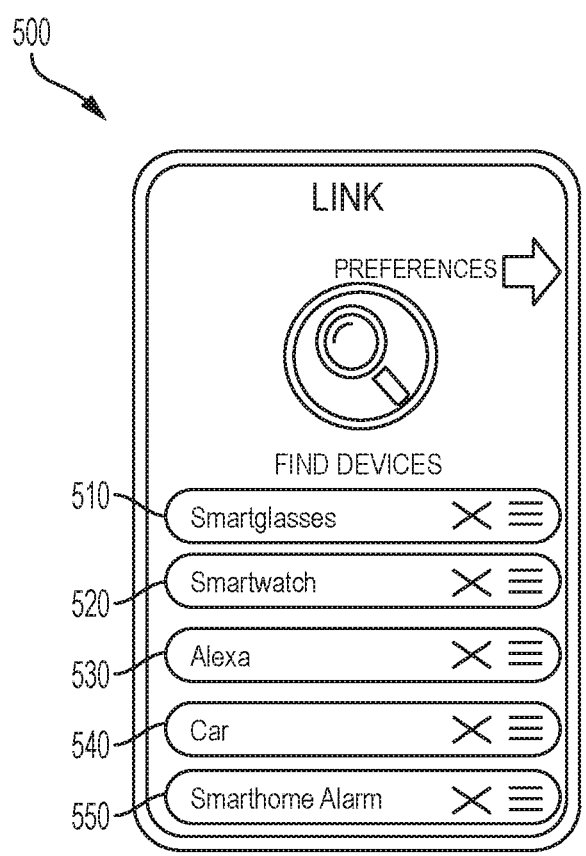
FIG. 5 illustrates an exemplary connection manager screen that can be used to pair and connect smartglasses, a smartwatch, or smartphone, or other devices for using artificial intelligence to control mobile devices used for presentation and display of mobile device tasks and control mobile devices used for presentation and display of mobile device tasks and applications and enhance presentation and display of augmented reality information with smartglasses or other mobile devices paired or connected to smartglasses, while not reducing visual acuity described herein in accordance with the inventions described herein.

FIG. 5 illustrates a connection manager screen that can be used to accept input commands to pair and connect smartglasses, a smartwatch, or smartphone to each other enhance experiencing augmented reality information described herein in accordance with the inventions described herein. The connection manager screen can be presented on one or all of smartglasses 200 by smartglasses mobile application 201, smartwatch 300 by smartwatch mobile application 301, and smartphone 400 by smartphone mobile application 401.

Screen 500 depicts devices that can be connected or paired. In this example, the screen is presented on smartphone 400, but it also could be presented on smartglasses 200 or smartwatch 300.

Screen 500 shows all devices in range, smartglasses 510 and smartwatch 520, Alexa 530, car 540, and smarthome alarm 550. Many other devices also could be paired or connected. Selecting smartglasses 510 and smartwatch 520, for example, will pair or connect those devices to the smartphone 400.

A user can select X to "forget" a device. Typically, only two devices can be supported at a time, so the top two devices will generally be "active" priority and will push out all other devices to connect when in range. When the user's main device can support more Bluetooth connections, such as when a smartphone is in use, the device mobile application controlling display and presentation of mobile device tasks and applications should activate additional connections with subsequently lower priority until the device's capacity is reached. There is no limit to the number of devices that can be remembered by the connection manager screen 500. Devices can be renamed by using a long press, for example.

In addition to securing a stable connection among smartphone 400 and his other wearable devices, smartglasses 200 and smartwatch 300, and providing the ability to adjust display and input preferences among these devices, the smartglasses mobile application 201, smartwatch mobile application 301, and smartphone mobile application 401 will also be able to connect to other compatible systems.

For example, a smart home which is controlled by a tablet, with the ability to turn on lights, heating air conditioning remotely. The smartglasses mobile application 201, smartwatch mobile application 301, or smartphone mobile application 401 (depending upon which device's mobile application is used to control task or application operations among the devices) could be prompted to connect to smart home appliances and other devices once entered (disconnecting from other devices if needed). Once connected, the lights and air could be controlled by a tap of a button on the smartwatch 300, smartphone 400, or simply via a vocal command through the smartglasses 200.

The smartglasses 200 connectivity module and hardware 260 and cellular communications unit and hardware 275 and smartglasses mobile application 201, smartwatch mobile application 301, smartwatch connectivity module and hardware 370 and cellular communications unit and hardware 375, smartphone mobile application 401, smartphone connectivity module 495, and smartphone cellular communications unit and hardware 495 can facilitate transmission of data between those mobile devices and help realize the potential of wearable devices used in concert, mitigating their individual limitations.

TABLE 1

| LINK App Use Case | Visual Data (WATCH) | Audio Data (GLASSES) | Both |
|---|---|---|---|
| SMS Messaging | In & Out (display texts, type texts) | Opt In & Out (hear texts, dictate texts) | Opt (eg, hear a text and type a response) |
| Dialing/Receiving Call | Opt In & Out (Dial via contacts list, call back) | In & Out (Siri call initiation, LOUD touchpad answering) | Opt (eg, dial off WATCH and talk with GLASSES) |
| Notifications | Out (display push notes) | Opt Out (Hear push notes) | No unless preference |
| Nav | Opt In & Out (type address, display arrow) | In & Out (Siri nav initiation and hear directions) | Opt ("tell me and show me how to get there" |
| Games | In & Out (display game, watch touch control) | Opt Out (game sound) | Opt (sound can be on WATCH or GLASSES) |
| LCD Token Wallet | Opt In & Out (Open app and send tokens) | Opt In & Out (Audio alerts about token price etc) | Opt (See visual confirmation of vocal transaction) |
| Weather | Opt In & Out (enter ZIP, see charts) | Opt In & Out (say city, hear temp) | Yes (See and hear info simultaneously) |
| Stocks | In & Out (charts, add ticker) | Opt Out (hear price alerts) | Opt (add tickers vocally) |
| Watch Dating Apps | In & Out (Enter bio, swipe profile) | No (unless speech to text through GLASSES) | Opt (Vocally swipe) |
| Video | Out | Out | Opt (Playback controls from WATCH or GLASSES) |
| Music | Opt In & Out (see library) | In & Out (voice-select song, hear music) | Opt (hear songs as you browse) |
| App Store | In & Out (navigate menus) | No (unless voice-select app download) | Opt (Vocal navigation of WATCH interface) |
| Camera | In & Out (Read codes, display viewfinder) | No (unless audio control of shutter desired) | No unless preference |
| Siri/Alexa/Bixby | Opt Out (display AI speech as text) | In & Out (Voice control and answers) | Opt (Can be done easily on GLASSES alone) |
| Notes | In & Out | In (speech recognition) | Opt ("Read that back to me") |
| Voice Memo | Opt In & Out (display library) | In & Out | Opt (Display timer on WATCH) |
| Calculator | In & Out | Opt In & Out via Siri | Opt (Visual representation of spoken queries) |
| Clock/Stopwatch | In & Out | Opt In & Out (set stopwatch/hear time) | Opt (Control stopwatch/snooze with voice) |
| Venmo | In & Out | Opt In & out via Siri | Opt (Visual confirmation of vocal transaction) |
| Watch OS Apps | In & Out | Opt Out (audio and voice commands where applicable) | Opt |
| Real Time Translation | In & Out (scan text, display translated) | Opt In & Out (picks up nearby speech, translates) | Opt (WATCH translates speech from GLASSES) |

The first column of Table 1 specifies tasks typically performed on mobile devices that can be enhanced by wearable peripherals. The second column describes the ways information can flow to and from smartwatch 300—whether the user can receive relevant data about the task from the smartwatch 300 (Out), and whether user input for the task is possible on the smartwatch 300 (In). The third column similarly describes the flow of input and output between the user and smartglasses 200. The fourth column shows when there is potential synergy between the smartwatch 300 and smartglasses 200 for the task. A mark of Optional (Opt) indicates that the user could choose whether or not to use the particular device for a task, and could select their preference in a settings panel within the mobile applications 210, or 310. An absence of the Opt mark can indicate that this would likely be the default setting for the task, or required to perform the task off-phone. When starting the task the mobile application 201, smartwatch mobile application 301, or smartphone application 401, whichever device mobile application controls what device is used for different tasks) would then engage the user's default wearable device(s) for relaying input and output to the smartglasses 200, smartphone 400, or smartwatch 300.

Smartwatch 300 can be used to both display and type SMS texts. Smartglasses 200 can chime when a text is received, and vocalize the text. Speech to text utility of AI software such as Siri, Bixby or Alexa can be used to send messages from smartglasses 200. There are many different configurations where either or both smartglasses 200 and smartwatch 300 can be used for the task, and the smartglasses mobile application 210 helps manage this. For example, one could set a preference on the settings panel of device the mobile application controlling task device preferences, to have incoming messages appear on the smartwatch, but activate AI in the smartglasses 200 to dictate a response.

Taking and making phone calls can be done hands free with smartglasses 200 alone, so this could be a default setting. However, the user may also want visual information such as call duration and signal strength, which could appear on the smartwatch 300 by issuing an override command. Similarly, if the smartwatch 300 has the capability, the user could select to take calls on it alone.

Push notifications, since they are often large in number, are most practically displayed on smartwatch 300. However, the user could elect to have their notifications vocalized in smartglasses 200.

Navigation application use is potentially safer when done through smartglasses 200 alone, as it does not draw attention in the same way as a traditional GPS or map application. However, a user could elect to also display the next turn, miles to destination or other useful information on the smartwatch 300. In the case of cycling, directions solely on the smartwatch 300 could be ideal. This is another case where many different control and display configurations are possible via the device mobile application controlling the device used for a particular task. In the case of games, the user could elect whether to play the sound through the smartglasses 200. The smartwatch 300 could also be used an auxiliary display or game controller to the smartphone 400.

In the case of a wallet application, the user could access it via a smartglasses 200 or smartwatch 300, or both. Dual layer security features could be enabled, requiring multiple devices to unlock an account.

For a weather application, the user could easily gain advantage from both smartglasses 200 and smartwatch 300 in tandem. The user could dictate their postal code to the smartglasses 200, hear a brief weather report, and see crucial statistics on the smartwatch 300.

Due to the importance of visual data in stocks, the smartwatch 300 would be likely be preferred for most stock quote applications. However, pricing alerts and other useful functions could be relayed in the smartglasses 200.

For dating applications, a user could swipe profiles on the smartwatch 300, or see profiles on the smartwatch 300 and swipe with their voice through the smartglasses 300. Some dating applications provide the ability to call another party, which could be done on the smartglasses 300 for comfort.

Video sound can be played on smartwatch 300 and/or smartglasses 200, and playback controlled from either device.

For music listening applications, a music library could be accessed from either device, and have sound play on either device. The smartglasses 200 may be more comfortable for playback.

For an app store application, a visual representation is likely best viewed on smartwatch 300. However, simple oral commands like "show me what's trending" could be done through the smartglasses 200, with the result displayed on the smartwatch 300.

For a camera application, there is not much function for smartglasses 200 without a camera, except remotely capturing images from smartphone 400.

For AI systems, it would be preferable that the smartglasses 200 should be the default device stored the lookup tables. Many of the light tasks we need our mobile devices to do can be done on the smartglasses 200 alone. However, the smartwatch 300 could also display answers and be used to start and cancel vocal inquiries. Notes can be typed or dictated depending on the user's preference. Smartglasses. The smartglasses mobile application 210 can engage the user's preferred device when "take a note" command is given.

Voice memos are best performed with the smartglasses 200, but a visual list of notes displayed on the smartwatch 300 can also be useful.

Calculations on a calculator application better lend themselves to the smartwatch 300, unless it is particularly simple arithmetic easily done by the AI of the smartglasses 200.

An alarm can be shut off by voice on either device. This is a highly flexible task.

For instant payment applications, payments can be initiated and confirmed on either or both devices.

Smartglasses microphone and speakers can be used to augment smartwatch applications. There is some flexibility in using language translation applications as well. A watch could scan foreign language words, and relay vocal information via the smartglasses mobile application 201 to the smartglasses 200. Likewise, foreign words can be spoken into the smartglasses 200, and a native translation could appear on the smartwatch 300.

There are many use cases where both smartwatch 300 and smartglasses 300 working together can improve the mobile computing experience. The device mobile application controlling the devices used for particular tasks (whether the smartglasses mobile application 201, smartwatch mobile application 301, or smartphone mobile application 401) rationalizes the flow of information between paired or connected devices, by providing a way to make the experience better fit individually.

The mobile application used to facilitate control of the device for displaying and presenting information will leverage voice control developer tools and smartphone AI systems such as Siri, Bixby or Alexa wherever possible to help improve the experience of various applications. The mobile application controlling the devices used for particular tasks should essentially run in the background, increasing the ease of which the user goes about their typical tasks.

The mobile application controlling the devices used for particular tasks can be programmed to have preset priorities for display of augmented reality information that depend upon the application being used with the smartglasses. These preset priorities can be set using optional smartglasses mobile application 201, smartwatch mobile application 301, or smartphone mobile application 401 and stored in lookup tables accessible with those mobile applications. The lookup tables can contain defaults that will select the device on which AR information is viewed or heard based on what device would typically be best suited to view or hear that output.

Figure 6:
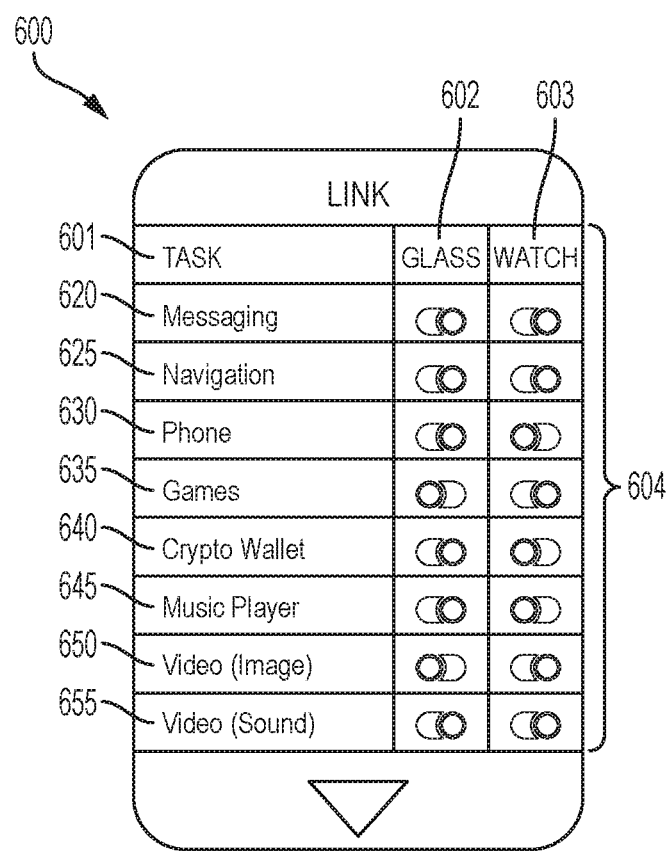
FIG. 6 illustrates an exemplary control panel screen to manage the input and output of data between a paired or connected smartglasses, smartwatch, and smartphone for using artificial intelligence to control mobile devices used for presentation and display of mobile device tasks and control mobile devices used for presentation and display of mobile device tasks and applications and enhance presentation and display of augmented reality information with smartglasses or other mobile devices paired or connected to smartglasses, while not reducing visual acuity described herein in accordance with the inventions described herein.

FIG. 6 depicts an example of a control panel screen that can be used to set defaults for different tasks in which smartglasses 200, smartwatch 300, smartphone 400 or combinations thereof, including both, can be used. The control panel can be accessed from whichever device is set to control the devices used for particular tasks using a mobile application on the particular controlling device.

Screen 600 shows a task column 601 with corresponding columns for 602 smartglasses 200, 603 for smartwatch 300, and 604 for both devices, with setting buttons to manage device inputs and outputs. Tasks include 610 messaging, 620 navigation, 630 phone, 635 games, 640 crypto wallet, music player 645, video (Image) 650, video (Sound) 655. Other configurations and tasks could be included. The default settings can optionally be stored in lookup tables residing in memory or on mobile applications.

When the device mobile application controlling display and presentation of tasks and applications is actively open, it automatically prepares all connected devices to receive all applicable forms of user input to navigate its interface. For example, when device mobile application controlling display and presentation of tasks and applications is a smartwatch mobile application, it can receive all applicable forms of input to its interfaces. For example, interface screens can be fluidly navigated through voice commands received from connected or paired smartglasses 200.

Figure 7:
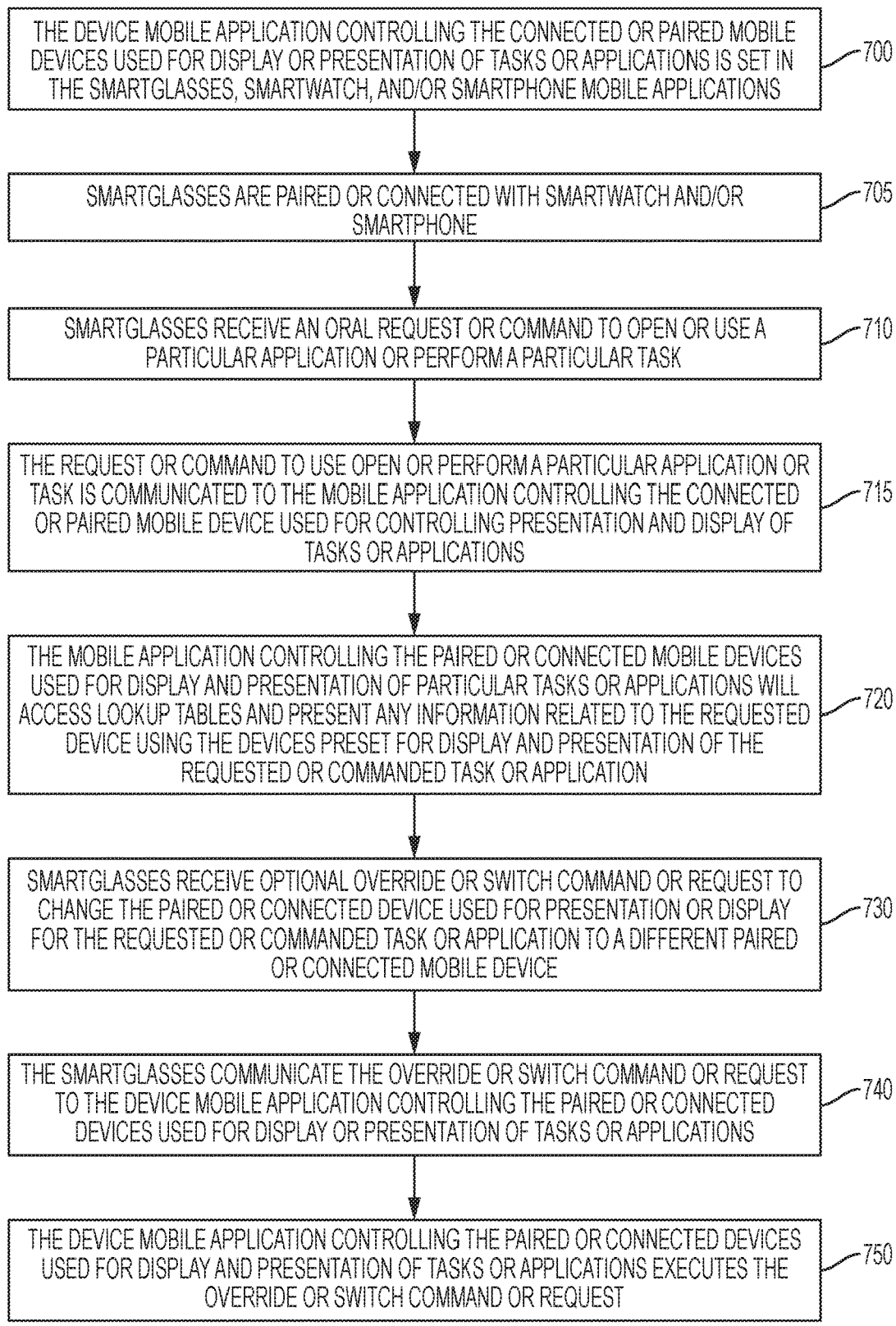
FIG. 7 is a flowchart illustrating methods for using artificial intelligence to control mobile devices used for presentation and display of mobile device tasks and control mobile devices used for presentation and display of mobile device tasks and applications and enhance presentation and display of augmented reality information with smartglasses or other mobile devices paired or connected to smartglasses, while not reducing visual acuity, as described herein in accordance with the inventions described herein.

FIG. 7 is a flowchart depicting a method for using artificial intelligence to control mobile devices used for presentation and display of tasks and applications enhance experiencing augmented reality information using smartglasses. This method can also be used to override the preset priorities for display. Steps need not necessarily be performed in the precise order presented here. Variations will be apparent to those skilled in the art.

At step 700, the device mobile application controlling paired or connected devices used for display or presentation of tasks or applications is set either in the smartglasses mobile application 201 or the smartwatch mobile application 301, and/or smartphone mobile application 401.

At step 705, smartglasses 200 are paired or connected with smartwatch 300 and/or smartphone 400 using smartglasses connectivity module 260, cellular communications unit and hardware 275, smartwatch connectivity module 370, and/or smartphone connectivity module 490, and cellular communications unit and module 495.

At step 710, the microphone 225 of smartglasses 200 and smartglasses AI interface 280 receive an oral request or command audibly proceeded by language, such as "tell me" or "show me," that is communicated to glasses' AI interface 280. Examples of questions can include questions designed to perform tasks, open applications, including map or navigation, music, wallet, application store, calculator, watch, stopwatch, banking or money transfer, video, games, stocks, weather, etc.

At step 715, the request or command will be communicated to the device mobile application controlling connected or the paired mobile device used for display or presentation of tasks and applications. If that mobile application is not smartglasses mobile application 201, the request will be communicated to the device mobile application controlling display and presentation of tasks and applications via smartglasses At step 720, the mobile application controlling the paired or connected devices the devices used for particular tasks or applications will access lookup tables and present or display information related to the requested task or application using the paired or connected devices (smartglasses, smartphone, or smartwatch) preset to view or hear that information.

The mobile application controlling the paired or connected mobile devices used for particular tasks or applications can be smartglasses mobile application 201, smartwatch mobile application 301, or smartphone mobile application 401.

At step 730, the smartglasses 200 microphone 225 and smartglasses AI interface 280 may receive an optional override or switch command to override the information in the lookup tables with specific commands to display information on a different paired or connected device, i.e., the smartglasses 200, smartwatch 300, or smartphone 400 using an oral override or switch command to override settings in the lookup table.

At step 740, the smartglasses 200 communicate the override or switch request or command to the device mobile application controlling the paired or connected devices used for display or presentation of tasks or applications.

At step 750, the device mobile application controlling the paired or connected devices used for display or presentation of tasks or applications executes the override or switch command or request.

The ability to override lookup table preset defaults and switch the paired or connected mobile device used for display and presentation of information related to a requested or commanded task or application will provide flexibility and control to enhance perception of AR information.

Smartglasses mobile application 210 increases the utility of smartglasses 200 and smartwatch 300 and of wearing them in tandem via an easy-to-use software applications. When carrying a smartphone 400 to supply a wearable device with an Internet signal, highly complex interface and processing power may no longer be necessary, it could be adapted to the native software ecosystem of a smartwatch 300 or smartglasses 200.

Smartglasses mobile application 210 will facilitate transmission of data between mobile devices and their users. It will help realize the potential of wearable devices used in concert, mitigating their individual limitations.

Smartglasses mobile application 210 also has several unique applications in the facilitation of cryptographic transactions. The first is the ability to authorize cryptographic (cryptocurrency) transactions via wearable smartglasses and smartwatches. This is through user input transmitted through the smartglasses 200 or smartwatch 300 to smartglasses AI interface 280, smartwatch AI module and interface 360, or smartphone AI interface 460, which then causes a particular transactional action to take place in a separate cryptocurrency token wallet application. Device input/output preferences selected in the smartglasses mobile application 210 prime the wearable devices to receive this input, and inform how prompts from the separate token wallet applications are communicated to the user.

For example, one could set their smartglasses 200 to be the preferred device for communication with a cryptocurrency token wallet application, provided the cryptocurrency token wallet application has the necessary tooling to make it compatible smartglasses AI interface 280, smartwatch AI module and interface 360, or smartphone AI interface 460. The user could then initiate an on-blockchain token transfer, check a token balance, and more via their smartglasses 200 alone. The smartglasses could communicate confirmation prompts, balance inquiries etc., back to the user.

The second application in regards to cryptographic currency transactions involves the use of QR codes. When smartglasses 200 or smartwatch 300 contains an embedded camera capable of transmitting visual information to a connected smartphone 400 AI interface 460, then the smartglasses mobile application 210 could assist the user in rapidly reading a QR code containing a cryptocurrency public address (or product information) via one of their wearable devices. Whichever device is preferred by the user can be set in the smartglasses mobile application 210 to manage the input/output flow of such transactions. For example, scanning a QR code with the smartwatch could be set to open an AI-compatible cryptocurrency token wallet application (or traditional banking application) on the smartphone, preparing a transaction to this address. The user could then speak the desired transaction amount into their smartglasses 200, hear a confirmation prompt, speak their consent, and see a visual receipt on the smartwatch 300. In this way the smartglasses mobile application 201 can assist the user in communication with public blockchains. Extrapolating from this function, the smartglasses mobile application 210 could be used to read QR codes in one device, and manage actions on it in another.

A strong application of this function is its potential use in point-of-sale terminals. Should a retailer desire the acceptance of cryptocurrency for transactions, they could simply put out a "paper wallet" containing QR codes of their cryptocurrency addresses. Customers could then scan the wallet at checkout via their desired wearable, confirm payment vocally, then receive their goods and digital receipt. For businesses that can operate solely on cryptocurrency, or at such a time as that becomes a standard form of remittance, this function of the mobile application can almost completely remove point-of-sale hardware and software costs for a retail business. An additional function for cryptographic transactions is the ability to add security layers more suited to, or only possible in wearable devices to cryptographic transactions. For example, a common feature in smartwatches like smartwatch 300 is the ability to read heart rates and other biometric parameters. A cryptocurrency token wallet app could be updated to be sensitive to finger print data or retinal scan data in the unlocking of one's funds based on a unique biometric identifier. The smartglasses mobile application 210 could be set to prime the token wallet application to receive this data from the smartwatch 300. Therefore, a cryptographic transaction could be given secondary verification via the user's finger print. Another example would be unique voice signatures as an additional security layer. The smartglasses mobile application 210 could prepare and send vocal data to a token wallet app for additional identity screening along with other biometric quantities.

An additional property of the smartglasses mobile application 210 is its adaptability to being a discrete AI interface, purpose-built to create a smooth, highly functional and symbiotic user experience among their various wearable devices and smartphones. This would be the most efficient method of data transport between wearables and smartphone applications, as it removes the currently needed intermediary of the smartphone's factory-installed AI in being the gateway for user data from wearables into the smartphone operating system. Adapting the smartglasses mobile application 201 into an AI interface would require the following:

The ability to be the default virtual assistant on the smartphone.

The ability to run in the background in an always-on fashion, even while the phone is locked.

The ability to communicate input/output data between itself, the user, and a variety of applications.

The ability to respond to the "talk" button on wearables, earbuds and Bluetooth headsets.

One skilled in the art will realize the invention may be embodied in other specific forms without departing from the spirit or essential characteristics thereof. The foregoing embodiments are therefore to be considered in all respects illustrative rather than limiting of the invention described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on this application based hereon. Accordingly, the disclosure of the embodiments of the invention is intended to be illustrative, but not limiting, of the scope of the invention.

The invention has been described in terms of particular embodiments. The alternatives described herein are examples for illustration only and not to limit the alternatives in any way. The steps of the invention can be performed in a different order and still achieve desirable results. It will be obvious to persons skilled in the art to make various changes and modifications to the invention described herein. To the extent that these variations depart from the scope and spirit of what is described herein, they are intended to be encompassed therein. It will be understood by those skilled in the art that various changes in form and details may be made therein without departing from the scope of the invention encompassed by the appended claims.

What is claimed is:

1. Smartglasses comprising:

a bridge, rims, the rims comprising corrective lenses, temples connected to end pieces, a printed circuit board, memory, battery, microphone, speakers, connectivity module, cellular communications unit and hardware, and artificial intelligence interface in electronic communication, the connectivity module and the cellular communications unit and hardware configured and programmed to pair or connect the smartglasses to a smartphone, smartwatch, or other devices or systems and support active priority for the smartphone, the smartwatch, or the other devices or systems, the smartglasses configured and programmed to receive oral requests or commands at the microphone and artificial intelligence interface to perform mobile device tasks or applications and process and communicate the oral requests or commands to a mobile device application controlling paired or connected devices or systems used for display or presentation of information related to the requested or commanded tasks or applications, the mobile device application and the artificial intelligence interface are programmed or configured to control paired or connected devices used for display or presentation of information related to requested or commanded tasks or applications and to display or present information related to the requested or commanded tasks or applications on the smartglasses, a paired or connected smartwatch, smartphone, or other paired or connected devices or systems, based on default settings, and to activate connections between the paired or connected smartglasses smartphone, the smartwatch or additional devices or systems having higher priority until a capacity for connections with the smartglasses, the smartphone, the smartwatch or the additional devices is reached, and receive at the microphone oral commands to override or switch the default settings and display or present information on a paired or connected as specified in the override or switch command and the smartglasses are configured and programmed to receive oral requests or commands at the microphone and artificial intelligence and process and communicate the oral requests or commands to the mobile device application controlling paired or connected devices used for display or presentation of information related to requested or commanded tasks or applications switch display from a mobile device specified in the default settings to the paired or connected device or devices specified in the switch or override command.

2. The smartglasses of claim 1, further comprising a camera, wherein the default settings are stored in memory in lookup tables of the mobile device application controlling paired or connected devices used for display or presentation of information related to the requested or commanded tasks or applications and are set in a settings screen, and the additional devices or systems include a car or a smarthome system.

3. The smartglasses of claim 2, further comprising a smartglasses mobile application, wherein the mobile device application controlling paired or connected devices used for display or presentation of information related to requested or commanded tasks or applications is the smartglasses mobile application.

4. The smartglasses of claim 2, wherein the mobile device application controlling paired or connected devices used for display or presentation of information related to requested or commanded tasks or applications is a smartwatch mobile application.

5. The smartglasses of claim 4, wherein the default settings for presenting augmented reality information related to SMS text messages are a paired or connected smartwatch.

6. The smartglasses of claim 5, wherein the artificial intelligence interface is configured and programmed to vocalize SMS text messages in the smartglasses and to receive and send orally dictated responses to SMS text messages.

7. The smartglasses of claim 6, wherein the default settings for phone calls are the smartglasses.

8. The smartglasses of claim 7, the default settings for phone calls further comprise presenting visual information on one or more of call duration, phone number, or and signal strength on a paired or connected smartwatch.

9. The smartglasses of claim 8, wherein the default settings for receiving push notifications is the paired or connected smartwatch.

10. The smartglasses of claim 9, wherein the default settings for receiving push notifications further comprise receiving audible information of push notifications at the smartglasses.

11. The smartglasses of claim 10, wherein the default settings for receiving visual information from navigation applications is the paired or connected smartwatch.

12. The smartglasses of claim 11, wherein the default settings for receiving audio information from navigation applications is the smartglasses.

13. The smartglasses of claim 12, wherein the default settings for a weather application, music application, or app store application is one or both of the smartglasses and the paired or connected smartwatch.

14. The smartglasses of claim 13, wherein the default settings for visual data from stock application is the paired or connected smartwatch and the smartglasses for pricing alerts.

15. The smartglasses of claim 14, wherein the default settings for video and video sound can be controlled from and displayed on one or both of the smartglasses and the paired or connected smartwatch or a paired or connected smartphone.

16. The smartglasses of claim 15, wherein the connectivity module is configured and programmed to pair or connect the smartglasses to smart home systems, including heating, cooling, or lighting systems.

17. The smartglasses of claim 2, wherein the mobile device application controlling paired or connected devices used for display or presentation of information related to requested or commanded tasks or applications is a smartphone mobile application.

18. A method for controlling display and presentation of information related to mobile device tasks or applications with smartglasses comprising:
   setting a device mobile application for controlling connected or paired mobile devices used for presentation and display of mobile device tasks or applications;
   pairing or connecting the smartglasses with one or more paired or connected mobile devices supporting an active priority using a smartglasses connectivity module or a cellular communications unit and hardware, wherein the paired or connected devices include a smartwatch and a smartphone;
   pairing or connecting the smartglasses or the one or more paired or connected devices with additional devices having higher priority until a capacity for connections with the smartglasses, the one or more paired or connected devices or the additional devices is reached.
   making an audible command or request at a microphone of the smartglasses to display or present information related to the commanded or requested mobile device task or application;
   the smartglasses processing the command at an artificial intelligence interface of the smartglasses;
   communicating the command or request to the device mobile application controlling connected or paired mobile devices used for presentation and display of mobile device tasks; and
   receiving and displaying the information related to the commanded or requested mobile device task or application on the smartglasses or a paired or connected smartwatch or smartphone based on preset default settings;
   receiving an override or switch command at the smartglasses microphone to override or switch displaying the information related to the request or command to display or present information related to the commanded or requested mobile device task or application from a mobile device in the default settings to one more other mobile devices paired or connected or paired mobile device or devices;
   the smartglasses communicating the override or switch request to the device mobile application controlling the connected or paired mobile devices used for presentation and display of mobile device tasks or applications;
   and presenting the information related to the commanded or requested mobile device task or application at the one or more other mobile devices specified in the override request or switch command.

19. The method of claim 18, wherein the preset default settings are stored in lookup tables on the device mobile application controlling connected or paired mobile devices used for presentation and display of mobile device tasks or applications.

20. The method of claim 19, wherein the device mobile application controlling the connected or paired mobile devices used for presentation and display of mobile device tasks or applications is a smartglasses mobile application.

21. The method of claim 20, wherein the device mobile application controlling the connected or paired mobile devices used for presentation and display of mobile device tasks or applications is a smartwatch mobile application.

22. The method of claim 19, wherein the device mobile application controlling the connected or paired mobile devices used for presentation and display of mobile device tasks or applications is a smartphone mobile application.

23. The method of claim 22, further comprising pairing or connecting the smartglasses with smart home systems, including heating, cooling, or lighting systems; and controlling the smart home systems through voice commands spoken to the smartglasses.

24. The method of claim 23, further comprising using the paired or connected mobile devices used for communicating with public blockchains, and perform blockchain transactions.

25. The method of claim 24, further comprising using the paired or connected mobile devices mobile device tasks or applications reading and acting on QR codes or unique biometric identifier data.

26. The method of claim 25, further comprising using the paired mobile devices for communicating biometric security information and using the biometric security information to perform cryptographic functions performed in a token wallet application.

* * * * *